Oct. 21, 1941.　　　J. R. NEWKIRK　　　2,259,579
SPRING RETURN PUSH DOOR
Filed July 6, 1940　　　2 Sheets-Sheet 2
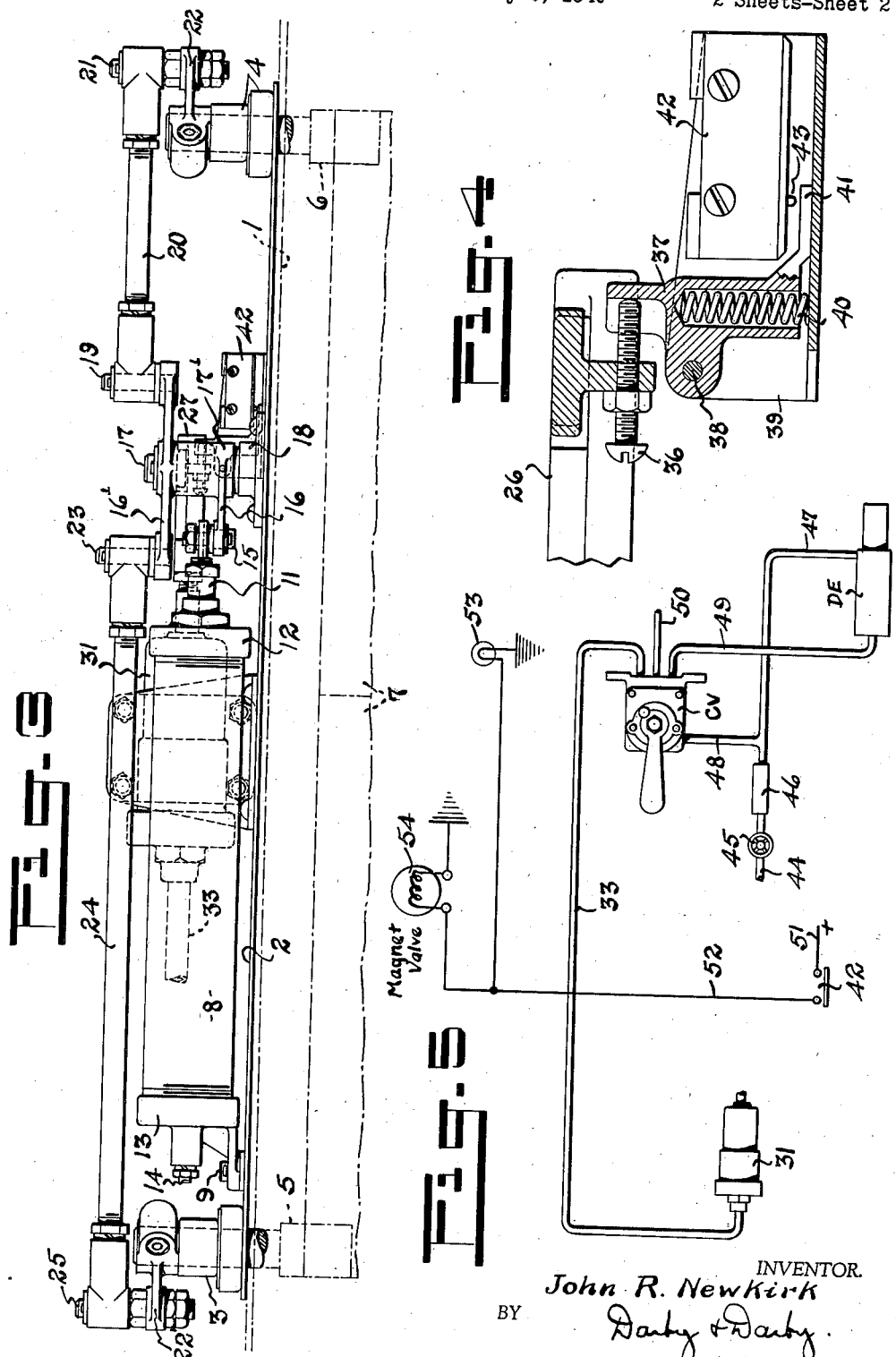
INVENTOR.
John R. Newkirk
BY Darby & Darby
Atts.

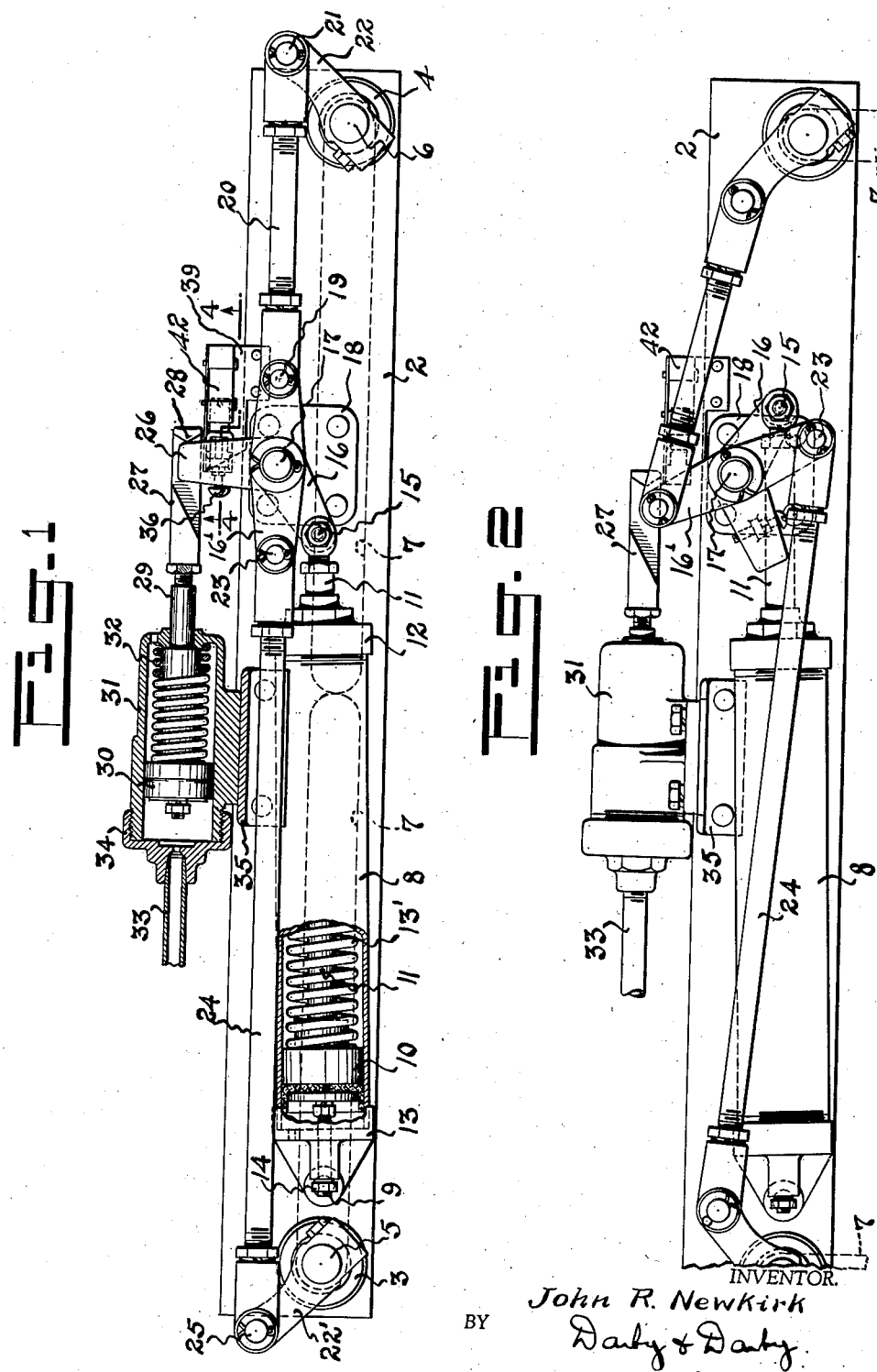

Patented Oct. 21, 1941

2,259,579

UNITED STATES PATENT OFFICE 2,259,579

SPRING RETURN PUSH DOOR

John R. Newkirk, Rahway, N. J., assignor to National Pneumatic Company, New York, N. Y., a corporation of West Virginia Application July 6, 1940, Serial No. 344,189

7 Claims. (Cl. 292—1)

This invention is concerned with door operating systems of a type more particularly useful on vehicles such as motor buses, street cars and the like.

The general object of the invention is to provide a structurally improved and simplified door operator for the rear doors of motor buses functionally adapted to operation under the conditions prevailing in the use of rear exit doors on such vehicles.

More specifically it is an object of this invention to provide operating mechanism of this type of a nature to cause the door to be locked when closed, to be unlocked by the act of the vehicle operator, to be pushed open by a person desiring to exit through the rear door, to signal the vehicle operator that the rear door is open, to interlock with the brake mechanism of the vehicle to prevent its movement while the door is open, to automatically close as soon as the exiting person has left the vehicle, to signal this fact and to release the brake interlock.

The other and more detailed objects of this invention will be apparent from the following description when taken in connection with the attached drawings.

This invention resides substantially in the combination, construction, arrangement and relative location of parts, as will be described in detail below.

In the accompanying drawings,

Figure 1 is a top plan view with some parts in cross-section of the apparatus of this invention to be associated with the exit doors of a vehicle, showing the doors locked in closed position;

Figure 2 is a similar view in plan with a small portion broken away showing the position of the parts with the rear doors open;

Figure 3 is a side elevational view of the apparatus;

Figure 4 is an enlarged cross-sectional view on the line 4—4 of Figure 1 showing the switch operator details; and Figure 5 is a wiring and pipe diagram of the complete apparatus of the invention.

With the advent of one-man operated motor vehicles the problem of providing suitable boarding and alighting facilities with due regard to safety in view of the presence of only one attendant, namely the vehicle operator has been of growing importance. Many forms of operators and the controls therefor for the doors of vehicles situated at points remote from the station of the vehicle operator have been devised. The necessity for insuring absolute safety for passengers using the remote exit doors of such vehicles has led to rather complicated control systems for the operation of the exit doors in conjunction with the use of various mirror systems, the use of which has been required because of the possibility of less than one hundred percent safety operation of such systems.

The apparatus of the present invention is of extremely simple construction and operation and performs in a manner so as to meet all of the operating conditions to which such apparatus is subjected with absolute certainty and with one hundred percent safety to the passengers utilizing it. The full nature of the construction and operation of the apparatus will be best understood by a description thereof which will now be undertaken.

In the accompanying drawings has been shown apparatus suitable for the operation of the exit door of a motor bus, which door is normally relatively remotely situated with respect to the vehicle operator's station, and which is frequently obscured by passengers standing in the aisle when the bus is more or less fully loaded. As illustrated in the drawings the exit door is shown as comprising two sections or leaves 7 which are mounted for rotation upon vertical shafts 5 and 6 journaled for rotation at the sides of the exit doorway so that the free edges of the door leaves 7 are in abutting relation when closed, but swing outwardly to a position parallel to the path of exit movement of the passengers. Only the upper ends of the shafts 5 and 6 are shown, and as indicated they are journaled in suitable bearings 3 and 4 mounted on a base plate 2 which is supported on the lintel 1 of the doorway. The door closing motor is shown comprising a cylinder 8 which is closed at one end by a cap 13 provided with an extension which is pivotally mounted on the pivot pin 9 attached to the supporting plate 2. The other end of the cylinder is closed by means of a cap 12 through which the piston rod 11 may slidably move in either direction. As shown in Figure 1, the inner end of the piston rod 11 is provided with a piston 10 and between it and the cap 12 is a spring 13' which is adapted to be compressed when the doors are open. The space between the piston and the left hand end of the cylinder (Figure 1) is open to the atmosphere through an adjustably restricted port so that the rate at which air escapes from the cylinder as the piston 10 is returned by the spring 13' may be controlled to give the desired speed of door closing movement.

The protruding end of the piston rod 11 is pivotally connected at 15 to a lever 16 which is integral with a sleeve 17' (Figure 3) pivotally mounted on the pivot pin 17. This pivot pin is supported on the plate 1 by means of a suitable base 18. Also integral with the sleeve 17' is the double ended lever 16' and the lever 26. One end of lever 16' is pivotally connected at 19 to a link which in turn is pivotally connected at 21 to an arm 22 secured in shaft 6 to cause its rotation. The other end of lever 16' is pivotally connected at 23 to a link 24 which in turn is connected at 25 to the arm 22' secured to the shaft 5 to cause its rotation.

Supported on a suitable base 35 secured to the plate 2 is a motor for operating the locking mechanism including a cylinder 31 closed at one end by cap which provides a means of connecting the fluid pressure supply and exhaust pipe 33 to the cylinder. Within the housing is a piston 30 having a piston rod 29 projecting exteriorly of the cylinder. A suitable spring 33 lies between the piston 30 and the end wall of cylinder 31 so as to be compressed when fluid pressure is supplied to the cylinder from the pipe 33. Secured to the projecting end of the rod 29 is an L-shaped member 27, the end 28 of which is positioned to engage the lever 26 when the doors are closed as shown in Figure 1.

As is more clearly shown in Figure 4, lever 26 is provided with a depending projection in which is mounted an adjustable screw 36 which may be locked in adjusted position. This screw is engaged by a lever 37 pivotally mounted at 38 on a support 39 suitably secured to the plate 2. Mounted on this support is a switch 42 having an operating member 43 positioned to be engaged by an extension 41 and the lever 37. A spring 40 is provided to move the lever 37 to close the switch which is normally in open position when lever 26 is withdrawn to remove the engagement between screw 36 and lever 37.

The piping and circuit diagram for this apparatus is shown in Figure 5. A pipe 44 extends from any suitable source of pressure fluid through a branch 47 to the differential engine DE which is provided for operating the front door of the vehicle, that is the door adjacent the vehicle operator's station. Included in the supply connection is a cut-off valve 45 and the usual air strainer 46. A branch 48 supplies fluid pressure to the control valve CV. This valve is provided with an exhaust pipe 50. A branch connection 49 extends from the valve to the differential engine DE, and the pipe 33 extends from the cylinder 31 to the valve. As is well known the differential engine is of a type employing a pair of connected pistons of different diameters. The pipe 47 continuously supplies pressure fluid to the cylinders in the region between these pistons. The opposite end of the larger cylinder is connected to the pipe 49. The switch 42 which is normally open is supplied with electrical energy from a suitable grounded current source through the wire 51. A wire 52 extends from this switch to ground through the signal light 53 and the winding of the magnet valve 54. The signal lamp 53 is positioned adjacent the vehicle operator's station. The magnet valve may be any one of a number of well known types suitably connected in an air supply pipe for the pneumatic brakes of the vehicle so that when the magnet valve is energized air is supplied directly to the brake cylinders even though the operator should for any reason attempt to cut it off through his normal control thereof.

The operation of the system will now be described. The apparatus as illustrated in Figure 1 is in the position which it assumes when the doors are closed and locked. The doors are locked by reason of the linkage connection between their operating shafts. As clearly shown in Figure 1, the double ended lever 16 is in such a position that the centers of the pivot points 21, 19, 23 and 25 are all on a straight line which includes the center of the pivot pin 17. Thus any attempt to open the doors by applying pressure to them will fail because the toggle linkage system is in a straight line locked position. Under these conditions the control valve CV is in its normal position at which time pipe 49 is open to the atmosphere through the exhaust pipe 50 and pipe 33 is connected to pipe 44 through the branch 48 so that air is supplied to the cylinder 31 holding the piston 30 in the position shown and compressing spring 32. Thus the L-shaped member 27 is at least far enough to the right (Figure 1) to permit lever 26 to be so placed that the toggle linkages referred to above are in locked position. It does not matter whether the member 27 moves further to the right than this position because piston 10 is in the position shown in Figure 1 where it can move no further to the left, with the result that lever 26 cannot make any further movement in a clockwise direction. The locking action of the linkage system is aided by reason of the fact that spring 13' is acting to resist any movement thereof in a counter-clockwise direction. This action of the spring 13' is not necessary, however, in view of the well known locking function of such toggle arrangements. Under the conditions just described lever 37 is in the position shown in Figure 4, so that switch 42 is open.

After the vehicle has come to a stop the operator moves the handle of valve CV from the normal position shown to a position where pipe 49 is connected to pipe 44 through the branch 48. This energizes the door engine DE to cause the front door to open. In another position air is exhausted from the cylinder 31 and at the same time pipes 49 and 44 remain connected. Spring 32 may now move piston 30 to the left (Figure 1) carrying with it the member 27, which acting on lever 26 causes a counter-clockwise rotation of lever 16', moving the pivot centers 19 and 23 slightly out of line with the pivot centers 21 and 25. The rear doors 7 are now unlocked and are free to be manually opened by any passenger desiring to leave the vehicle at the exitway. In order to open the doors the passenger merely presses against them. This causes them to rotate from the position shown in Figure 1 to the position shown in Figure 2. As this occurs the linkage system moves to the position shown in Figure 2 at the time the doors are fully open. By this time piston 10 has moved as far to the right as it normally goes, thereby completely compressing spring 13'. As soon as the lever 26 has moved from the position shown in Figure 1 the small distance that the member 27 moves it when cylinder 31 is exhausted, lever 37 is free so that spring 40 may move it about the pivot pin 38 to cause the extension 41 to engage the switch operator 43 and close the switch 42. The closing of switch 42 completes circuits to ground through the signal light 53 and the brake interlock magnet valve 54. Thus the operator is apprised of the fact that the doors are unlocked and air is supplied to the brake cylinders so that they may not be released by the operator. As soon as the passenger frees the doors spring 13' causes piston 10 to move back to the left. The rate of its return movement is determined by the adjustment of the restricted exhaust port for cylinder 8. This closing movement continues until the doors are nearly closed, at which time lever 26 engages the member 27.

When the front door passageway is clear the operator returns his valve CV to its normal position so that air is exhausted from the engine DE through the pipe 49, whereupon the front door closes. At the same time air is supplied to the cylinder 31 moving the member 27 back to the position shown in Figure 1, that is its normal door closed position, thereby freeing lever 26 with the result that the spring 13' completes the return movement of piston 10 to cause final movement of the toggle linkage system into aligned position, which is but a very small movement. Just as the toggle linkage system reaches straight line or locking position switch 42 opens, extinguishing the signal light 53 and de-energizing the brake interlock magnet valve 54 so that the brakes are released in so far as the interlock is concerned. If the operator has not released the brakes through his control he then does so, having received the signal from lamp 53 that the rear door is closed and locked. If he has already set his control to release the brakes they will be actually released upon de-energization of the magnet valve 54. The vehicle is then free to proceed.

It may be noted here, as is well known in the art, that the magnet valve 54, or some equivalent device, may be used to control in other ways the brake apparatus to insure that the brakes are applied so long as the rear door is opened or unlocked. As is sometimes done, the magnet valve or its equivalent may control the interlock in other ways as by preventing operation of the vehicle operator's brake control. The particular manner of using the interlock is not within the scope of this invention.

In still another position of valve CV pipe 33 is opened to exhaust so that the rear doors may be pushed open but the front door remains closed. In a final position of valve CV pipe 49 is connected to pipe 44 and at the same time pipe 33 is opened to exhaust. The valve CV is a well known type of valve, sometimes called a universal valve.

From the above description it will be apparent to those skilled in the art that the principles of this invention may be embodied in other physical forms without departure from the novel subject matter thereof. I do not, therefore, desire to be strictly limited to the disclosure as given for purposes of illustration, but rather to the scope of the claims granted me.

What is claimed is:

1. In a door operating system the combination including a door, a motive device for closing the door, a toggle linkage system connecting the motive device with the door, said linkage system taking a position to lock the door when closed, and motive means for moving the linkage system a sufficient amount to destroy its locking action whereby the door may be pushed open.

2. In a door operating system the combination including a door, a motive device for closing the door, a toggle linkage system connecting the motive device with the door, said linkage system taking a position to lock the door when closed, and motive means for moving the linkage system a sufficient amount to destroy its locking action whereby the door may be pushed open, the opening movement of the door energizing the first motive device so that it closes the door when free.

3. In a door operating system the combination including a pair of door sections, a pair of shafts rotatably supported upon which said doors are mounted, a motive device for closing said door sections, a toggle linkage system inter-connecting the motive device with both of said shafts, said linkage system when the doors are closed being positioned to lock the doors, and motive means for moving the linkage system from that position to unlock the doors whereby they may be pushed open.

4. In a door operating system the combination including a pair of door sections, a pair of shafts rotatably supported upon which said doors are mounted, a motive device for closing said door sections, a toggle linkage system inter-connecting the motive device with both of said shafts, said linkage system when the doors are closed being positioned to lock the doors, and motive means for moving the linkage system from that position to unlock the doors whereby they may be pushed open, the opening movement of the doors energizing the first motive device so that it closes the doors when free.

5. In a door operating system the combination including a pair of door sections, a pair of shafts rotatably supported upon which said doors are mounted, a motive device for closing said door sections, a toggle linkage system inter-connecting the motive device with both of said shafts, said linkage system when the doors are closed being positioned to lock the doors, and a pressure fluid operated means when exhausted operating to move said linkage system to unlocked position whereby the doors may be pushed open.

6. In a vehicle door operating system the combination including a door, a motive device for closing the door, a toggle linkage system for connecting the motive device to the door, said linkage system being aligned when the door is closed to lock it in that position, and pneumatic means acting on said linkage system when de-energized for moving it out of aligned position whereby the door is free so that it may be pushed open.

7. In a vehicle door operating system the combination including a door, a motive device for closing the door, a toggle linkage system for connecting the motive device to the door, said linkage system being aligned when the door is closed to lock it in that position, and pneumatic means acting on said linkage system when de-energized for moving it out of aligned position whereby the door is free so that it may be pushed open, said first motive device being energized as the door is opened so as to close it when the door is free.

JOHN R. NEWKIRK.